(12) United States Patent
Call et al.

(10) Patent No.: US 10,003,058 B2
(45) Date of Patent: Jun. 19, 2018

(54) METHOD OF MAKING A CO-EXTRUDED, MULTI-LAYERED BATTERY SEPARATOR

(75) Inventors: Ronald W. Call, Rock Hill, SC (US); C. William Fulk, Jr., Charlotte, NC (US); Lie Shi, Charlotte, NC (US); Xiaomin Zhang, Charlotte, NC (US); Khuy V. Nguyen, Charlotte, NC (US)

(73) Assignee: Celgard, LLC, Charlotte, NC (US)

( * ) Notice: Subject to any disclaimer, the term of this patent is extended or adjusted under 35 U.S.C. 154(b) by 710 days.

(21) Appl. No.: 11/560,911

(22) Filed: Nov. 17, 2006

(65) Prior Publication Data

US 2008/0118827 A1    May 22, 2008

(51) Int. Cl.

| | |
|---|---|
| *B29C 47/04* | (2006.01) |
| *B29C 47/00* | (2006.01) |
| *H01M 2/16* | (2006.01) |
| *B29C 47/14* | (2006.01) |
| *B29C 47/20* | (2006.01) |
| *B29C 47/06* | (2006.01) |
| *B29C 47/12* | (2006.01) |
| *B29K 23/00* | (2006.01) |
| *B29K 27/00* | (2006.01) |
| *B29K 27/18* | (2006.01) |
| *B29K 29/00* | (2006.01) |
| *B29K 31/00* | (2006.01) |
| *B29K 59/00* | (2006.01) |
| *B29K 67/00* | (2006.01) |
| *B29K 77/00* | (2006.01) |
| *B29K 81/00* | (2006.01) |
| *B29K 105/00* | (2006.01) |
| *B29K 105/04* | (2006.01) |
| *B29K 105/06* | (2006.01) |
| *B29K 105/16* | (2006.01) |
| *B29L 9/00* | (2006.01) |
| *B29L 28/00* | (2006.01) |
| *H01M 10/0525* | (2010.01) |

(52) U.S. Cl.
CPC ......... *H01M 2/1653* (2013.01); *B29C 47/14* (2013.01); *B29C 47/20* (2013.01); *H01M 2/1686* (2013.01); *B29C 47/0004* (2013.01); *B29C 47/0021* (2013.01); *B29C 47/0033* (2013.01); *B29C 47/0042* (2013.01); *B29C 47/0057* (2013.01); *B29C 47/04* (2013.01); *B29C 47/043* (2013.01); *B29C 47/065* (2013.01); *B29C 47/12* (2013.01); *B29C 47/145* (2013.01); *B29K 2023/06* (2013.01); *B29K 2023/065* (2013.01); *B29K 2023/0625* (2013.01); *B29K 2023/0633* (2013.01); *B29K 2023/0683* (2013.01); *B29K 2023/12* (2013.01); *B29K 2027/08* (2013.01); *B29K 2027/18* (2013.01); *B29K 2029/04* (2013.01); *B29K 2031/00* (2013.01); *B29K 2059/00* (2013.01); *B29K 2067/00* (2013.01); *B29K 2067/006* (2013.01); *B29K 2077/00* (2013.01); *B29K 2081/04* (2013.01); *B29K 2105/0008* (2013.01); *B29K 2105/0026* (2013.01); *B29K 2105/0032* (2013.01); *B29K 2105/04* (2013.01); *B29K 2105/06* (2013.01); *B29K 2105/16* (2013.01); *B29K 2105/256* (2013.01); *B29L 2009/00* (2013.01); *B29L 2028/00* (2013.01); *H01M 10/0525* (2013.01)

(58) Field of Classification Search
CPC ... H01M 2/145; H01M 2/1686; H01M 2/1653
See application file for complete search history.

(56) References Cited

U.S. PATENT DOCUMENTS

| | | | | |
|---|---|---|---|---|
| 3,849,174 | A | * | 11/1974 | Ancker ................. B05D 1/265 156/244.11 |
| 4,257,997 | A | * | 3/1981 | Soehngen ............... A61L 2/26 264/145 |
| 4,650,730 | A | | 3/1987 | Lundquist et al. |
| 4,828,772 | A | * | 5/1989 | Lopatin et al. ............. 264/45.9 |
| 5,064,580 | A | * | 11/1991 | Beck et al. .................... 264/28 |
| 5,240,655 | A | | 8/1993 | Troffkin et al. |
| 5,281,491 | A | | 1/1994 | Rein et al. |
| 5,645,956 | A | * | 7/1997 | Degen et al. ................ 429/142 |
| 5,691,047 | A | | 11/1997 | Kurauchi et al. |
| 5,691,077 | A | | 11/1997 | Yu |
| 5,824,430 | A | * | 10/1998 | Higuchi et al. ............... 429/62 |
| 5,952,120 | A | | 9/1999 | Yu et al. |
| 6,080,507 | A | | 6/2000 | Yu |
| 6,096,456 | A | | 8/2000 | Takeuchi et al. |

(Continued)

FOREIGN PATENT DOCUMENTS

| | | | | |
|---|---|---|---|---|
| EP | 0924780 | * | 6/1999 | ............. H01M 2/16 |
| EP | 0924780 A1 | | 6/1999 | |

(Continued)

OTHER PUBLICATIONS

J. P. G. Villaluenga, B. Seoane, Permeation of carbon dioxide through multiple linear low-density polyethylene films, European Polymer Journal, vol. 36, Issue 8, Aug. 1, 2000, pp. 1697-1702.*

(Continued)

*Primary Examiner* — Rena Dye Cronin
(74) *Attorney, Agent, or Firm* — Hammer & Associates, P.C.

(57) ABSTRACT

A battery separator comprises a co-extruded, microporous membrane having at least two layers made of extrudable polymers and having: a uniform thickness defined by a standard deviation of <0.80 microns ($\mu m$); or an interply adhesion as defined by a peel strength >60 grams.

4 Claims, No Drawings

(56) References Cited

U.S. PATENT DOCUMENTS

| | | | |
|---|---|---|---|
| 6,346,350 B1 * | 2/2002 | Call et al. | 429/249 |
| 6,509,106 B1 * | 1/2003 | Edwards | C08L 23/06 |
| | | | 156/244.11 |
| 6,692,867 B2 | 2/2004 | Nark et al. | |
| 6,878,226 B2 | 4/2005 | Yu | |
| 8,758,887 B2 * | 6/2014 | Yen | B32B 7/02 |
| | | | 428/212 |
| 2002/0136945 A1 * | 9/2002 | Call et al. | 429/144 |
| 2003/0035943 A1 | 2/2003 | Jones et al. | |
| 2003/0148095 A1 | 8/2003 | Kollaja et al. | |

FOREIGN PATENT DOCUMENTS

| | | |
|---|---|---|
| EP | 1047141 A2 | 10/2000 |
| JP | 1065773 A | 3/1989 |
| JP | H-10-279717 A | 10/1998 |
| WO | WO 93/13565 A1 | 7/1993 |

OTHER PUBLICATIONS

Villaluenga et al., "Permeation of carbon dioxide through multiple linear low-density polyethylene films," Eur. Polymer J., Elsevier Science Ltd., p. 1697-1702, (Aug. 1, 2000).

U.S. Appl. No. 11/400,465, filed Apr. 7, 2006, Call, et al.

* cited by examiner

METHOD OF MAKING A CO-EXTRUDED, MULTI-LAYERED BATTERY SEPARATOR

FIELD OF THE INVENTION

The battery separator disclosed herein is a co-extruded, multi-layered battery separator. One embodiment of this separator may be used in lithium ion batteries.

BACKGROUND OF THE INVENTION

Multi-layered battery separators are disclosed in, for example, U.S. Pat. Nos. 4,650,730; 5,240,655; 5,281,491; 5,691,047; 5,691,077; 5,952,120; 6,080,507; 6,878,226; and U.S. Patent Publication No. 20020136945.

While several of the foregoing references mention that multi-layered separators may be made by a co-extrusion process, in commercial practice, the co-extrusion process has been difficult to implement on a commercial basis. Particularly, the products of previous co-extrusion trials have been fraught with uniformity issues that have inhibited the commercialization of products made by that process. These issues, it is believed, arise from the intricacies associated with simultaneously extruding at least two dissimilar polymers through a narrow orifice die. Accordingly, the prior attempts to produce a co-extruded, multi-layered battery separator have yielded non-uniform product. As such, no co-extruded, multi-layered battery separators are commercially available.

Therefore, there is a need for a co-extruded, multi-layered battery separator having uniform physical properties.

SUMMARY OF THE INVENTION

A battery separator comprises a co-extruded, microporous membrane having at least two layers made of extrudable polymers and having: a uniform thickness defined by a standard deviation of <0.80 microns (μm); or an interply adhesion as defined by a peel strength >60 grams.

DESCRIPTION OF THE INVENTION

The instant battery separator shall be described with regard to use in secondary lithium ion batteries (e.g., those used in cell phones, laptop computers, and other devices requiring a light-weight charge storage device). It being understood, however, that the invention is not so limited and the instant battery separator may be used in other battery systems (e.g., NiMH, NiCd, alkaline, primary lithium, to name a few).

In general, battery separators for use in lithium ion batteries are microporous membranes having the following typical physical properties: thickness—less than 5 mils (125 μm), or less than 2 mils (50 μm), or less than 1 mil (25 μm), the practical lower limit is about ⅓ mil (8 μm); puncture strength—greater than 400 grams, or greater than 550 grams; average pore sizes—0.005-10.000 μm, or 0.01-5.00 μm, or 0.05-2.00 μm; Gurley values (ASTM-D726(B))-5-100 seconds, or 10-60 seconds.

The instant battery separator is a co-extruded, multi-layered battery separator. Co-extruded refers to a process where polymers are simultaneously brought together in an extrusion die and exit from the die in a form, here a generally planar structure, having at least two discrete layers joined together at the interface of the discrete layers by, for example, a commingling of the polymers forming the interface of the discrete layers. The extrusion die may be either a flat sheet (or slot) die or a blown film (or annular) die. The co-extrusion process shall be described in greater detail below. Multi-layered refers to a separator having at least two layers. Multi-layered may also refer to structures with 3, 4, 5, 6, 7, or more layers. Each layer is formed by a separate polymer feed stream into the extrusion die. The layers may be of differing thicknesses. Most often, at least two of the feed streams are of dissimilar polymers. Dissimilar polymer refers to: polymers having dissimilar chemical natures (e.g., PE and PP, or PE and a co-polymer of PE are polymers having dissimilar chemical natures); and/or polymer having the same chemical nature but dissimilar properties (e.g., two PE's having differing properties (e.g., density, molecular weights, molecular weight distributions, rheology, additives (composition and/or percentage), etc.)) However, the polymers may be the same or identical.

The polymers that may be used in the instant battery separator are those that are extrudable. Such polymers are typically referred to as thermoplastic polymers. Exemplary thermoplastic polymers include, but are not limited to: polyolefins, polyacetals (or polyoxymethylenes), polyamides, polyesters, polysulfides, polyvinyl alcohols, polyvinyl esters, and polyvinylidenes. Polyolefins include, but are not limited to: polyethylene (including, for example, LDPE, LLDPE, HDPE, UHDPE), polypropylene, polybutylene, polymethylpentane, co-polymers thereof, and blends thereof. Polyamides (nylons) include, but are not limited to: polyamide 6, polyamide 66, Nylon 10,10, polyphthalamide (PPA), co-polymers thereof, and blends thereof. Polyesters include, but are not limited to: polyester terephalthalate, polybutyl terephalthalate, co-polymers thereof, and blends thereof. Polysulfides include, but are not limited to, polyphenyl sulfide, co-polymers thereof, and blends thereof. Polyvinyl alcohols include, but are not limited to: ethylene-vinyl alcohol, co-polymers thereof, and blends thereof. Polyvinyl esters include, but are not limited to, polyvinyl acetate, ethylene vinyl acetate, co-polymers thereof, and blends thereof. Polyvinylidenes include, but are not limited to: fluorinated polyvinylidenes (e.g., polyvinylidene chloride, polyvinylidene fluoride), co-polymers thereof, and blends thereof.

Various materials may be added to the polymers. These materials are added to modify or enhance the performance or properties of an individual layer or the overall separator. Such materials include, but are not limited to:

Materials to lower the melting temperature of the polymer may be added. Typically, the multi-layered separator includes a layer designed to close its pores at a predetermined temperature to block the flow of ions between the electrodes of the battery. This function is commonly referred to as 'shutdown.' In one embodiment, a trilayer separator has a middle shutdown layer. To lower the shutdown temperature of the layer, materials, with a melting temperature less than the polymer to which they are mixed, may be added to the polymer. Such materials include, but are not limited to: materials with a melting temperature less than 125° C., for example, polyolefins or polyolefin oligomers. Such materials include, but are not limited to: polyolefin waxes (polyethylene wax, polypropylene wax, polybutene wax, and blends thereof). These materials may be loaded into the polymer at a rate of 5-50 wt % of the polymer. Shutdown temperatures below 140° C. are obtainable in one embodiment. Shutdown temperatures below 130° C. are obtainable in other embodiments.

Materials to improve the melt integrity of the membrane may be added. Melt integrity refers to the ability of the membrane to limit its loss or deterioration of its physical dimension at elevated temperatures such that the electrodes remain physically separated. Such materials include mineral fillers. Mineral fillers include, but are not limited to: talc, kaolin, synthetic silica, diatomaceous earth, mica, nanoclay, boron nitride, silicon dioxide, titanium dioxide, barium sulfate, calcium carbonate, aluminum hydroxide, magnesium hydroxide and the like, and blends thereof. Such materials may also include, but are not limited to, fine fibers. Fine fibers include glass fibers and chopped polymer fibers. Loading rates range from 1-60 wt % of the polymer of the layer. Such materials may also include high melting point or high viscosity organic materials, e.g., PTFE and UHMWPE. Such materials may also include cross-linking or coupling agents.

Materials to improve the strength or toughness of the membrane may be added. Such materials include elastomers. Elastomers include, but are not limited to: ethylene-propylene (EPR), ethylene-propylene-diene (EPDM), styrene-butadiene (SBR), styrene isoprene (SIR), ethylidene norbornene (ENB), epoxy, and polyurethane and blends thereof. Such materials may also include, but are not limited to, fine fibers. Fine fibers include glass fibers and chopped polymer fibers. Loading rates range from 2-30 wt % of the polymer of the layer. Such materials may also include cross-linking or coupling agents or high viscosity or high melting point materials.

Materials to improve the antistatic properties of the membrane may be added. Such materials include, for example, antistatic agents. Antistatic agents include, but are not limited to, glycerol monostreates, ethoxylated amines, polyethers (e.g., Pelestat 300, commercially available from Sanyo Chemical Industrial of Japan). Loading rates range from 0.001-10 wt % of the polymer of the layer.

Materials to improve the surface wettability of the separator may be added. Such materials include, for example, wetting agents. Wetting agents include, but are not limited to, ethoxylated alcohols, primary polymeric carboxylic acids, glycols (e.g., polypropylene glycol and polyethylene glycols), polyolefin functionalized with maleic anhydride, acrylic acid, glycidyl methacrylate. Loading rates range from 0.01-10 wt % of the polymer of the layer.

Materials to improve the surface tribology performance of the separator may be added. Such materials include lubricants. Lubricants include, for example, fluoropolymers (e.g., polyvinylidene fluoride, polytetrafluoroethylene, low molecular weight fluoropolymers), slip agents (e.g., oleamide, stearamide, erucamide, Kemamide®, calcium stearate, silicone. Loading rates range from 0.001-10 wt % of the polymer of the layer.

Materials to improve the polymer processing may be added. Such materials include, for example, fluoropolymers, boron nitride, polyolefin waxes. Loading rates range from 100 ppm to 10 wt % of the polymer of the layer.

Materials to improve the flame retardant nature of the membrane may be added. Such materials include, for example, brominated flame retardants, ammonium phosphate, ammonium hydroxide, alumina trihydrate, and phosphate ester.

Materials to facilitate nucleation of the polymer may be added. Such materials include nucleating agents. Nucleating agents include, but are not limited to, sodium benzoate, dibenzylidene sorbitol (DBS) and it chemical derivatives. Loading rates are conventional.

Materials to color the layers may be added. Such materials are conventional.

In the manufacture of the instant battery separator, the polymers are co-extruded to form a multi-layered, nonporous precursor, and then the precursor is processed to form the micropores. Micropores may be formed by a 'wet' process or a 'dry' process. The wet process (also referred as: solvent extraction, phase inversion, thermally induced phase separation (TIPS), or gel extraction) generally involves: the addition of a removable material prior to the formation of the precursor, and subsequently removing that material, for example, by an extraction process to form the pores. The dry process (also referred to as the Celgard process) generally involves: extruding a precursor (not including any removal material for pore formation); annealing the precursor, and stretching the precursor to form the micropores. The instant invention will be discussed hereinafter with regard to the dry process.

To obtain the uniform dimensional properties of the instant co-extruded, multi-layered battery separator, an extrusion die having a specific shear rate was used. It was determined that the shear rate of the die must be at a minimum 4/sec at a throughput of 18-100 lbs/hr (8.2-45.4 Kg/hr) per layer. In one embodiment, the shear rate was ≥8/sec at a throughput of 18-100 lbs/hr (8.2-45.4 Kg/hr) per layer. All other parameters are those conventionally known.

EXAMPLES

The foregoing invention is further illustrated in the following examples. Table 1 illustrates 11 samples made according to the foregoing discussion of the invention. Table 2 illustrates the use of various materials to improve the melt integrity of the separator to a separator without such material. Table 3 illustrates the use of other of the foregoing materials to improve various properties of the separator. The test procedures used in compiling the information in the Tables is set out below.

Test Procedures

Gurley: Gurley was measured by two methods. In the first method defined as the Japanese Industrial Standard Gurley (JIS Gurley), Gurley is measured using the OHKEN permeability tester. JIS Gurley is defined as the time in seconds required for 100 cc of air to pass through one square inch of film at constant pressure of 4.8 inches of $H_2O$. In the second method, Gurley is measured according to the ASTM D-726 procedure and is defined as the time in seconds required for 10 cc of air to pass through one square inch of film at constant pressure of 4.8 inches of $H_2O$.

Tensile properties: MD and TD Tensile strength is measured using Instron Model 4201 according to ASTM-882 procedure.

Puncture strength: Puncture strength is measured using Instron Model 4442 based on ASTM D3763. The units of puncture strength are newtons. The measurements are made across the width of stretched product and the averaged puncture energy (puncture strength) is defined as the force required to puncture the test sample.

Peel Strength or Adhesion: Intra-layer adhesion is tested using the Chatillon TCD-200 Peel Force Tester.

Shrinkage: Shrinkage is measured at 90° C. for 60 minutes using a modified ASTM D-2732-96 procedure.

Thickness: The membrane thickness values are measured using the Emveco Microgage 210-A precision micrometer according to ASTM D374. Thickness values are reported in units of micrometers (μm). 20 individual micrometer readings taken across the width of the sample are averaged.

Porosity: The porosity of the microporous film is measured by method ASTM D2873.

High Temperature Melt Integrity: High Temperature Melt Integrity is measured using Thermal Mechanical Analysis (TMA). The TMA compression probe is used to measure the thickness change of a separator under compression at a constant load of 125 gm as the temperature is scanned from 25 to 300° C. at a rate of 5° C./min. The percentage of thickness retained at 250° C. is defined as the high temperature melting integrity.

Wettability: One drop of a typical lithium ion electrolyte is placed on a sample of the membrane. The change in appearance of sample from opaque to nearly transparent is recorded. For the wettable separator, appearance should be nearly uniform translucent with no opaque areas. A non-wettable sample retains its opacity.

ER (Electrical Resistance): The units of electrical resistance are ohm-cm$^2$. The separator resistance is characterized by cutting small pieces of separators from the finished material and then placing them between two blocking electrodes. The separators are completely saturated with the battery electrolyte with 1.0M LiPF$_6$ salt in EC/EMC solvent of 3:7 ratio by volume. The resistance, R (Ω) of the separator is measured by 4-probe AC impedance technique. In order to reduce the measurement error on the electrode/separator interface, multiple measurements are needed by adding more separator layers. Based on the multiple layer measurements, the electrical (ionic) resistance, R$_s$ (Ω) of the separator saturated with electrolyte is then calculated by the formula, $$R_s = \frac{\rho_s l}{A} \quad (1)$$

where $\rho_s$ is the ionic resistivity of the separator in Ω-cm, A is the electrode area in cm$^2$ and l is the thickness of the separator membrane in cm. The ratio $\rho_s/A$ is the slope calculated for the variation of separator resistance (ΔR) with multiple separator layers (Δδ) which is given by, $$\text{slope} = \frac{\rho_s}{A} = \frac{\Delta R}{\Delta \delta}. \quad (2)$$

Also see U.S. patent application Ser. No. 11/400,465 filed Apr. 7, 2006, test procedure related to 'ionic resistance', incorporated herein by reference.

Pin Removal: The pin removal test simulates the cell winding process. Pin Removal force is the force in grams required to pull the pin from the center of jelly roll after winding. A battery winding machine was used to wind the separator around a pin (or core or mandrel). The pin is a two (2) piece cylindrical mandrel with a 0.16 inch diameter and a smooth exterior surface. Each piece has a semicircular cross section. The separator, discussed below, is taken up on the pin. The initial force (tangential) on the separator is 0.5 kgf and thereafter the separator is wound at a rate of ten (10) inches in twenty four (24) seconds. During winding, a tension roller engages the separator being wound on the mandrel. The tension roller comprises a ⅝" diameter roller located on the side opposite the separator feed, a ¾" pneumatic cylinder to which 1 bar of air pressure is applied (when engaged), and a ¼" rod interconnecting the roller and the cylinder. The separator consists of two (2) 30 mm (width)×10" pieces of the membrane being tested. Five (5) of these separators are tested, the results averaged, and the averaged value is reported. Each piece is spliced onto a separator feed roll on the winding machine with a 1" overlap. From the free end of the separator, i.e., distal the spliced end, ink marks are made at ½" and 7". The ½" mark is aligned with the far side of the pin (i.e., the side adjacent the tension roller), the separator is engaged between the pieces of the pin, and winding is begun with the tension roller engaged. When the 7" mark is about ½" from the jellyroll (separator wound on the pin), the separator is cut at that mark, and the free end of the separator is secured to the jellyroll with a piece of adhesive tape (1" wide, ½" overlap). The jellyroll (i.e., pin with separator wound thereon) is removed from the winding machine. An acceptable jellyroll has no wrinkles and no telescoping. The jellyroll is placed in a tensile strength tester (i.e., Chatillon Model TCD 500-MS from Chatillon Inc., Greensboro, N.C.) with a load cell (50 lbs×0.02 lb; Chatillon DFGS 50). The strain rate is 2.5 inches per minute and data from the load cell is recorded at a rate of 100 points per second. The peak force is reported as the pin removal force. Also see: U.S. Pat. No. 6,692,867, incorporated herein by reference.

Dielectric Breakdown: Voltage is increased on a sample until a dielectric breakdown of the material is observed. Dielectric Breakdown is expressed in volts. A separator is placed between two electrodes and a voltage is applied across the electrodes. The voltage is increased until dielectric breakdown of the separator is observed. Strong separators show high failure voltage. Any non-uniformity can lead to a low failure voltage.

Aquapore Size: Pore size is measured using the Aquapore available through PMI (Porous Materials Inc.). Pore size is expressed in microns, μm.

Mixed Penetration: Mixed penetration is the force required to create a short through a separator and is expressed in kilogram-force, kgf. Mixed penetration is the force required to create a short through a separator due to mixed penetration. In this test one starts with a base of a first metal plate, on top of this plate is placed a sheet of cathode material, on top of cathode is placed a separator, and on top of the separator is placed a sheet of anode material. A ball tip of 3 mm is then provided attached to a force gauge. The ball tip is connected to the first metal plate by a resistance meter. Pressure is applied to the ball tip, which is recorded on the force gauge. Once force is applied, there builds up an anode mix and a cathode mix on either side of the separator. When the resistance falls dramatically it indicates a short through the separator due to mixed penetration. Mixed penetration measures the strength of the separator and resistance towards mixed penetration. This has been found to more accurately simulate the behavior of a real cell. It is a better indicator than puncture strength of how a separator will behave in a cell. This test is used to indicate the tendency of separators to allow short-circuits during battery assembly. Also see U.S. patent application Ser. No. 11/400,465 filed Apr. 7, 2006, incorporated herein by reference.

TABLE 1

Examples of Bilayer & Trilayer Microporous Membrane

| | Celgard 2300 ® | Sample #1 | Sample #2 | Sample #3 | Sample #4 | Sample #5 | Sample #6 | Sample #7 | Sample #8 | Sample #9 | Sample #10 | Sample #11 |
|---|---|---|---|---|---|---|---|---|---|---|---|---|
| Description | PP/PE/PP | PP/PE 60% PP | PP/PE/PP 65% PP | PP/PE/PP 65% PP | PP/PE/PP 65% PP | PP/PE/PP 65% PP | PP/PE/PP 65% PP | PE/PP/PE 58% PP | PE/PP/PE 42% PP | PE/PP/PE 42% PP | PE/PP PE 42% PP | PE/PE/PE 0% PP |
| Thickness, μm | 26.9 | 15.7 | 9.5 | 13.0 | 15.7 | 18.6 | 19.9 | 9.4 | 9.8 | 16.5 | 17.2 | 17.1 |
| Thickness std dev | 0.72 | 0.46 | 0.37 | 0.46 | 0.45 | 0.65 | 0.55 | 0.49 | 0.45 | 0.51 | 0.60 | 0.54 |
| JIS Gurley, second | 540 | 485 | 391 | 427 | 550 | 560 | — | 283 | 195 | 373 | 517 | 364 |
| Shrinkage @ 90° C. for 1 hour, % | 2.7 | 0.8 | 0.7 | 0.9 | 1.6 | 1.6 | 1.5 | 2.8 | 5.4 | 1.7 | 3.7 | 7.2 |
| Elongation at break in MD/TD, % | 52/478 | 73/928 | 88/36 | 90/93 | 79/416 | 73/963 | 99/116 | 87/964 | 63/869 | 68/1031 | 77/967 | 75/1022 |
| Modulus in MD/TD, kg/cm² | 5170/2421 | 5425/3413 | 5166/5880 | 4724/5507 | 5764/4431 | 5959/4021 | 2969/2348 | 2957/1866 | 3645/2409 | 2833/1766 | 3846/1973 | 2979/2266 |
| Tensile strength in MD, kg/cm² | 1925 | 2133 | 2115 | 1749 | 2075 | 2006 | 1830 | 2077 | 1891 | 1923 | 1740 | 1925 |
| Tensile strength in TD, kg/cm² | 146 | 193 | 187 | 181 | 154 | 170 | 163 | 199 | 188 | 176 | 157 | 120 |
| Puncture Strength, g | 502 | 373 for PP side/218 for PE side | 177 | 252 | 365 | 421 | 357 | 183 | 154 | 255 | 243 | 283 |
| ER, ohm-cm² | 1.92 | 2.05 | 1.31 | 1.87 | 1.70 | 2.00 | 2.30 | 1.11 | 0.89 | 1.42 | 1.81 | 1.63 |
| Mixed Penetration, kgf | 130 | 110 | 89 | 112 | 105 | 123 | 122 | 70 | 67 | 104 | 118 | 103 |
| Dielectric Breakdown, volts | 2900 | 2082 | 823 | 1563 | 2337 | 2,341 | 2,568 | 754 | 1040 | 1476 | 1769 | 1564 |
| Porosity, % | 40.3 | 38 | 30 | 38 | 34 | 41 | 40 | 36 | 43 | 43 | 37 | 44 |
| Aquapore Size, μm | 0.028/0.073 | 0.027/0.064 | — | 0.025/0.061 | 0.025/0.062 | 0.028/0.068 | — | 0.027/0.06 | 0.03/0.07 | 0.027/0.072 | 0.026/0.060 | 0.055 |
| Peel Strength or Adhesion, g | 30 | >60 | >60 | >60 | >60 | >60 | >60 | >60 | >60 | >60 | >60 | >60 |

TABLE 2

Examples of Polymer Blends with Ceramic TiO₂ to Improve Melting Integrity

| | Comparison #1 | Sample #1 | Sample #2 | Sample #3 | Sample #4 |
|---|---|---|---|---|---|
| Description | PE/PE/PE trilayer | PE/PP/PE trilayer PE 65% in thickness | PP/PE/PP trilayer PE 35% in thickness | PP/PE/PP trilayer PE 58% in thickness | PE/PE/PE trilayer |
| Additive | no additives | 30% TiO2 in the middle layer | 20% TiO2 in the middle layer | 20% TiO2 in the middle layer | 20% TiO2 in the middle layer |
| Thickness, μm/thickness std dev | 17.1/0.54 | 17.8/0.40 | 15.3/0.61 | 15.9/0.44 | 15.5/0.46 |
| JIS Gurley, sec | 364 | 500 | 400 | 267 | 193 |
| Shrinkage @ 90° C. for 1 hour, % | 7.2 | 5.3 | 2.2 | 1.6 | 4.6 |
| Tensile strength in TD, kg/cm² | 120 | 110 | 148 | 180 | 100 |
| Puncture strength, g | 283 | 310 | 288 | 257 | 265 |
| ER, ohm-cm² | 1.63 | 1.76 | 2.60 | 1.53 | 1.08 |
| Mix Penetration, kgf | 103 | 102 | 99 | 104 | 87 |
| Dielectric Breakdown, volts | 1564 | 1586 | 1973 | 1643 | 1179 |
| Porosity, % | 43.5 | 43.5 | 41.5 | 45.0 | 46.6 |
| Aquapore Size, μm | 0.055 | 0.030/0.057 | — | 0.035/0.091 | 0.064 |
| Peel Strength or Adhesion, g | >60 | >60 | >60 | >60 | >60 |
| High Temperature Melt Integrity @250° C. by TMA | 0% | 13% | 15% | 20% | 10% |

TABLE 3

Examples of Polymer Blends

| | Comparison #1 | Sample #1 | Sample #2 | Sample #3 | Sample #4 | Sample #5 | Sample #6 | Sample #7 | Sample #8 |
|---|---|---|---|---|---|---|---|---|---|
| Description | PP/PE/PP trilayer without additives | PP/PE/PP trilayer with 5% ethoxylated alcohols in the middle layer to improve wettability | PP/PE/PP trilayer with 5000 ppm Kemamide ® in the outside layers to improve pin removal performance | PP/PE/PP trilayer with 2% antistatic additive Pelestat 300 in the outside layer | PE/PE/PE trilayer with 15% PE wax in the middle layer to lower the shutdown temperature | PE/PE/PE trilayer with 30% PE wax in the middle layer to lower shut down temperature | PP/PE/PP trilayer with 10% talc in outside PP layer and 20% TiO2 in the middle PE layer to improve melt integrity | PP/PE/PP trilayer with 20% talc in outside PP layer and 25% TiO2 in the middle PE layer to improve melt integrity | PP/PE/PP trilayer with 10% talc in outside PP layer and 25% TiO2 in the middle PE layer to improve melt integrity |
| Thickness, (μm) | 16.0 | 15.5 | 15.5 | 17.3 | 20.6 | 20.3 | 18.3 | 18.0 | 17.5 |
| Gurley, sec | 35 | 35 | 35 | 37 | 13 | 13-25 | 56 | 60 | 44 |
| Wettable | No | Yes | — | — | — | — | — | — | — |
| Shutdown Temp, ° C. | 130 | 130 | 130 | 130 | 127 | 124 | 130 | 130 | 130 |
| High Temperature Melt Integrity @ 250° C. | 0% | 0% | 0% | 0% | 0% | 0% | >20% | >20% | >20% |
| Pin Removal, g | 9100 | — | 8400 | — | — | — | — | — | — |

The present invention may be embodied in other forms without departing from the spirit and the essential attributes thereof, and, accordingly, reference should be made to the appended claims, rather than to the foregoing specification, as indicated the scope of the invention.

We claim:

1. A method of making a polyolefinic microporous multi-layered co-extruded membrane according to a dry process comprising the steps of:

co-extruding a nonporous polyolefinic multi-layered precursor through an extrusion die with a minimum shear rate of 4 sec$^{-1}$ and a throughput of 18-100 lbs/hr (8.2-45.4 Kg/hr) per layer, wherein at least two layers of said polyolefinic multi-layered precursor are polymerically dissimilar from one another; and processing the nonporous polyolefinic multi-layered co-extruded precursor to obtain the microporous polyolefinic multi-layered co-extruded membrane, wherein processing further includes: annealing the nonporous polyolefinic multi-layered microporous polyolefinic multi-layered co-extruded precursor; and stretching the annealed nonporous polyolefinic multi-layered microporous polyolefinic multi-layered co-extruded precursor, whereby the microporous polyolefinic multi-layered co-extruded membrane has a thickness in the range of 4-50 μm and a uniform thickness defined by a standard deviation of <0.8 μm.

2. The method of claim 1 wherein the shear rate is 8 sec$^{-1}$.

3. The method of claim 1 wherein the co-extruding further comprises:

adding a material to at least one layer of said multi-layered precursor.

4. The method of claim 3 wherein said material is selected from the group of materials adapted to: lower the melting temperature of one or more layers; improve the melt integrity of the membrane; improve the strength or toughness of the membrane; improve the antistatic properties of the membrane; improve the surface wettability of the membrane; improve the surface tribology performance of the membrane; improve the processing of one or more layers; improve the flame retardance of the membrane; facilitate nucleation of one or more layers; color one or more layers of the membrane; and combinations thereof.

* * * * *